United States Patent [19]

Klein et al.

[11] Patent Number: 4,724,346

[45] Date of Patent: Feb. 9, 1988

[54] PERMANENT MAGNET-EXCITED EXTERNAL ROTOR MOTOR

[75] Inventors: Hans-Wilhelm Klein, Wurzburg; Ernst Grecksch, Estenfeld; Helmut Schmidt, Reichenberg, all of Fed. Rep. of Germany

[73] Assignee: Siemens Aktiengesellschaft, Munich, Fed. Rep. of Germany

[21] Appl. No.: 906,336

[22] Filed: Sep. 11, 1986

[30] Foreign Application Priority Data

Sep. 23, 1985 [DE] Fed. Rep. of Germany ....... 3533883

[51] Int. Cl.$^4$ ............................................. H02K 7/00
[52] U.S. Cl. ..................... 310/67 R; 310/68 R; 310/71; 310/156; 310/184; 310/DIG. 3; 310/DIG. 6
[58] Field of Search .................. 310/67 R, 201, 68 R, 310/207, 68 B, 208, 71, DIG. 3, 72, DIG. 6, 180, 156, 184, 268; 361/413; 339/17 R, 17 F, 176 MF

[56] References Cited

U.S. PATENT DOCUMENTS

| 3,984,712 | 10/1976 | Hill | 310/71 |
|---|---|---|---|
| 4,259,603 | 3/1981 | Uchiyama | 310/68 B |
| 4,311,933 | 1/1982 | Riggs | 310/156 |
| 4,340,833 | 7/1982 | Sudo | 310/268 |
| 4,540,906 | 9/1985 | Blom | 310/68 B |
| 4,568,847 | 2/1986 | Schmider | 310/68 R |
| 4,633,110 | 12/1986 | Genco | 310/67 R |

FOREIGN PATENT DOCUMENTS

| 0149228 | 12/1984 | European Pat. Off. .......... 310/67 R |
|---|---|---|
| 2336955 | 1/1975 | Fed. Rep. of Germany .... 310/68 R |
| 2345150 | 3/1975 | Fed. Rep. of Germany . |
| 3331754 | 3/1984 | Fed. Rep. of Germany . |
| 0153260 | 11/1980 | Japan ................................. 310/68 R |

OTHER PUBLICATIONS

Journal of Electronic Engineering, vol. 22, Nr. 233, Jul. 1985.
Patent Abstracts of Japan, vol. 7, Nr. 136 (E-181) [1281], 14 Jun. 1983.

Primary Examiner—R. Skudy
Attorney, Agent, or Firm—Kenyon & Kenyon

[57] ABSTRACT

A permanent magnet-excited rotor motor is disclosed wherein, a circuit board (6) mounted on a radial motor attachment flange (22) is arranged. The front and rear sides of the circuit board (6) are equipped with conductor strips. On the front side, Hall transducers (15) influenced by rotor magnets (81) in a speed dependent manner are mounted. A flat cable brought in from the outside is divided into a first cable portion (12), passed through from the front with supply and signal voltage lines for the Hall transducers (15), and into a second cable portion (13) passed through from the back to the front with winding feed lines for the stator coil winding ends (14), which are likewise passed through from the back to the front of the circuit board (6) and thus can be soldered to the freely accessible front side.

7 Claims, 7 Drawing Figures

PERMANENT MAGNET-EXCITED EXTERNAL ROTOR MOTOR

BACKGROUND OF THE INVENTION

The invention relates to an electric motor, in particular a permanent magnet-excited external motor with an intermediate circuit board connecting in stator windings to an external cable.

It is the objective of the present invention to make possible, that in an electric motor, the coil ends of the stator winding can be connected only with the circuit board mounted on the stator in a preselected position, and hence to be soldered only from the stator-side face, to the conductor strips thereof and via the latter to an external winding feed line. The circuit board cost can be substantially reduced, while according to previous practice the motor would, be provided on both sides with conductor strips and additionally with an expensive so-called through contacts. Through-contacts comprise pins which are firmly embedded in the circuit board, creating an electrical connection between the front and back of the circuit board, so that for example a common cable, connected to the back of the circuit board and containing voltage supply and signal lines as well as the winding feed lines, projects from the front of the circuit board.

SUMMARY OF THE INVENTION

The construction according to the invention permits, on the one hand, soldering the supply and signal voltage lines as well as the external winding feed lines to the conductor strips of the circuit board having a plurality of passive and active electric components to the back and front of the circuit board, in a premounting process, and, on the other hand, with the circuit board mounted in its final position, soldering the coil winding ends of the stator winding to the front of the circuit board and leading them, via the associated conductor strips on the front, to the solder points of the winding feed lines, without requiring through-contacting elements in the circuit board. Thus, the motor can be manufactured much more cost-effectively but yet in a manner which insures full functionality.

For further simplification of the connection of the supply and signal voltage lines and of the winding feed lines to the coil winding ends, a variant of the invention provides that the supply and signal voltage lines and the winding feed lines are parts of a common flat cable, with at its circuit board-side end split into a first cable portion, whose solder ends are inserted from the front to solder connections on the back of the circuit board, and a second cable portion whose solder ends are inserted from the back into solder connections on the front of the circuit board, the other end of the common flat cable being appropriately connected to a common plug.

To ensure, on the one hand, easy accessibility of the solder connections for the coil winding ends on the front of the circuit board and, on the other hand, a minimum distance between the Hall transducers mounted on the circuit board and the associated rotor-side permanent magnets, the circuit board has a circular ring form, the Hall transducers being provided at its radically inner edge and the openings for insertion of the connecting ends of the coil winding ends at its outer edge. For a simple threading, the openings for the connecting ends of the external winding feed lines as well as the openings for the connecting ends of the coil winding ends are appropriately formed as slit-like threading openings on the inner and outer edges, respectively.

BRIEF DESCRIPTION OF THE DRAWINGS

In the following, the invention and additional advantageous variants thereof will be explained more specifically with reference to the drawings showing a schematically represented embodiment of the invention, wherein.

DETAILED DESCRIPTION OF THE INVENTION

Figure 1:
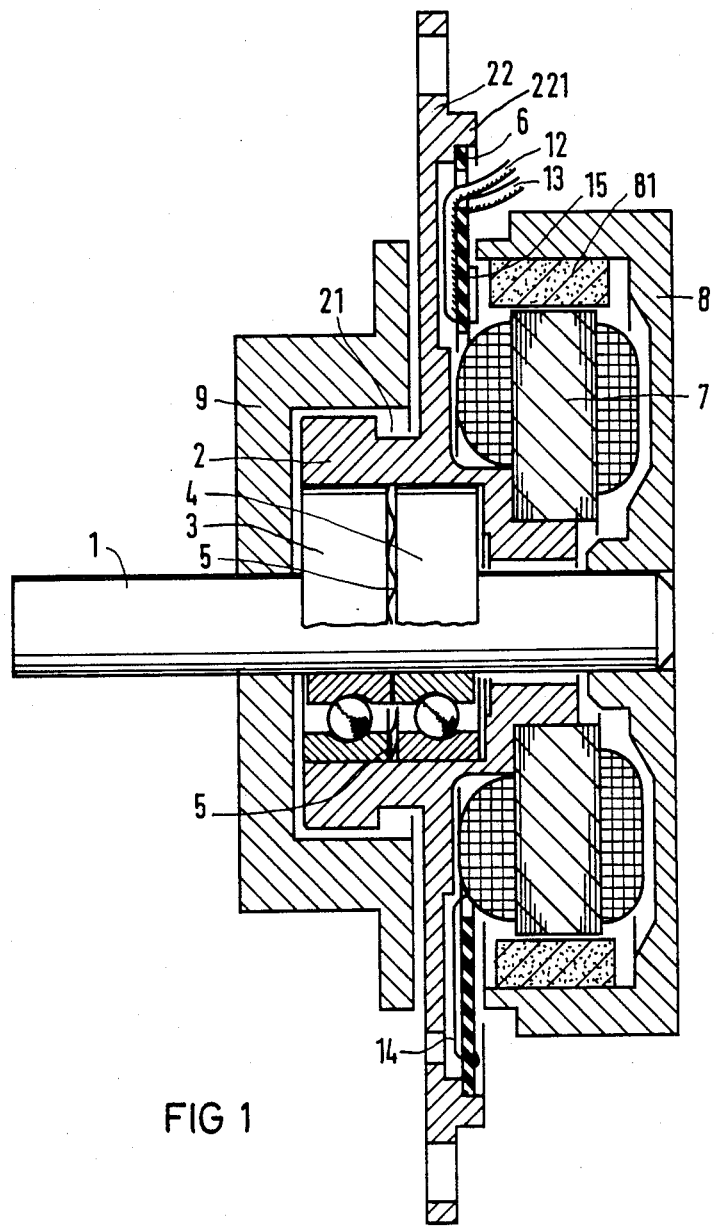
FIG. 1 shows an axial longitudinal section through an external rotor motor for driving a spindle of a disk pack drive.

FIG. 1, shows in an axial longitudinal section, an external rotor motor which drives a disk spindle 9 of a disk pack and can be attached to a data processing device through an attachment flange 22 integrally formed with a bearing housing 2. The bearing housing 2 serves indirectly and/or directly as a support for all structural parts shown in the drawings.

Press fitted onto the right-hand end of the bearing flange 2 there is a wound laminated stator 7. On the left side of the bearing housing 2, spaced axially away from the wound stator 7, a bearing bore is provided, into which two ball bearings 3, 4 are inserted from the open end face of the bearing housing on thh left. A spring washer 5 with a corrugated surface in circumferential direction is disposed between the bearings. Mounted in the ball bearings 3, 4 is a rotor shaft 1, on the left end of which the disk spindle 9 is secured. On the right end of the shaft there is a bell-shaped rotor cover 8 supporting permanent magnet rings 81 for the generaion of the excitation field for the external rotor motor.

On the end face of the attachment flagne 22 toward the stator, inside an axially projecting peripheral edge 221, a circuit board 6 is mounted, on which Hall transducers 15 are arranged which are associated with the operationally rotating permanent magnet rings 81 and are therefore arranged adjacent on the end face of the board. The circuit board 6 is coated on its front and back and is connected to supply voltage and signal lines of a first flat cable portion 12 as well as to external control feed lines of a second flat cable portion 13 for the coil ends 14 of the stator winding mounted on the stator lamination 7.

To be able, on the one hand, to mount the bearing housing at its right end with the wound stator lamination 7 before the ball bearings 3, 4 are introduced, and to fully connect the stator winding to the circuit board mounted on the attachment flange and, on the other hand, to be able to support the bearing housing without damage, in particular in the region of its thin-walled transition from the bearing bore to the stator seat, as the two ball bearings 3, 4 are inserted, a recess in the form of a peripheral groove 21 is advantageously proivded at the outer circumference of the bearing housing 2. Due to this groove, the reaction forces formed by the press fitting of the ball bearings can be absorbed in a thick walled part of the bearing housing, thus avoiding excessive bending stresses of parts of the bearing housing vulnerable to deformation. Furthermore the part of the bearing housing to the right of the support is available for unhindered mounting of the stator or of a circuit board since it is not necessary to supply axial support against the compressive force for the ball bearings.

Figures 2, 3, 4, 5:
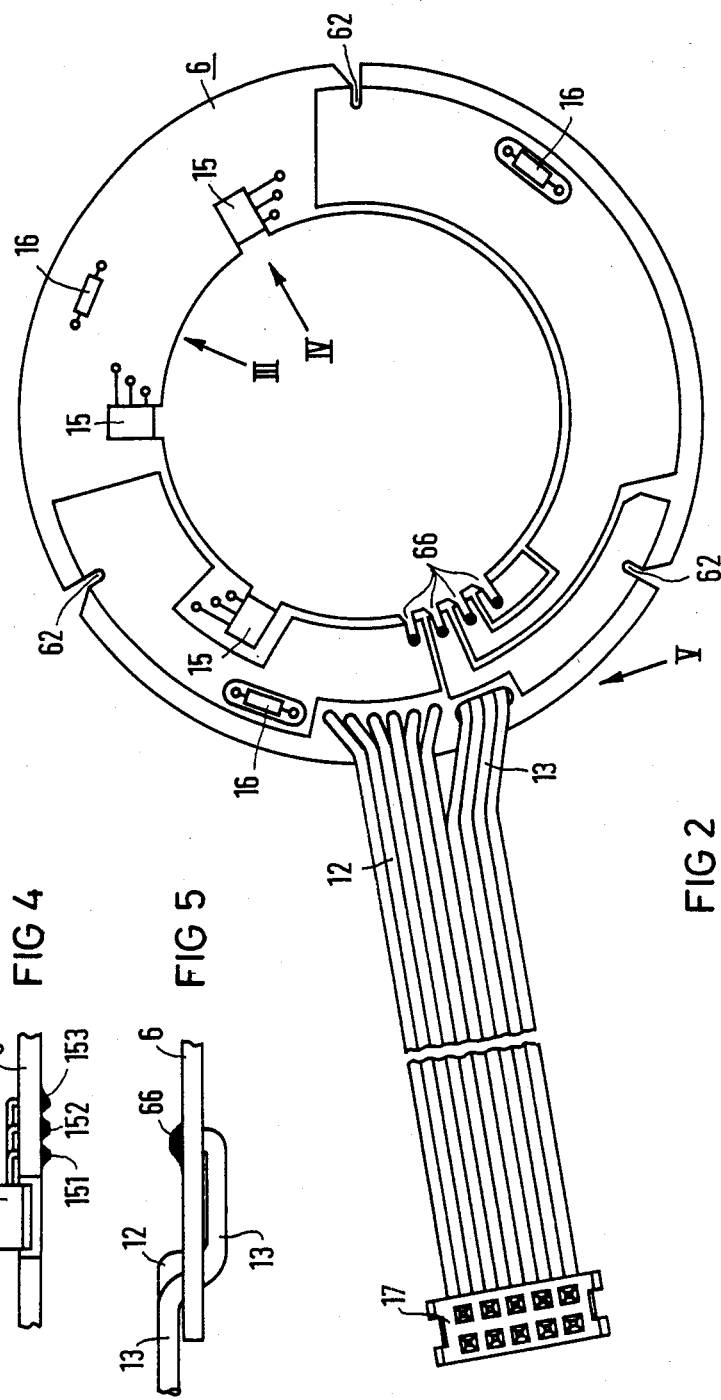
FIG. 2 shows a prefabricated circuit board, having various active and passive electric components mounted thereon and connected to an external flat cable.
FIG. 3 shows a sectional view of the circuit board of FIG. 2 in direction III.
FIG. 4 shows a sectional view of the circuit board of FIG. 2 in direction IV.
FIG. 5 shows a sectional view of the circuit board of FIG. 2 in direction V.
Figure 7:
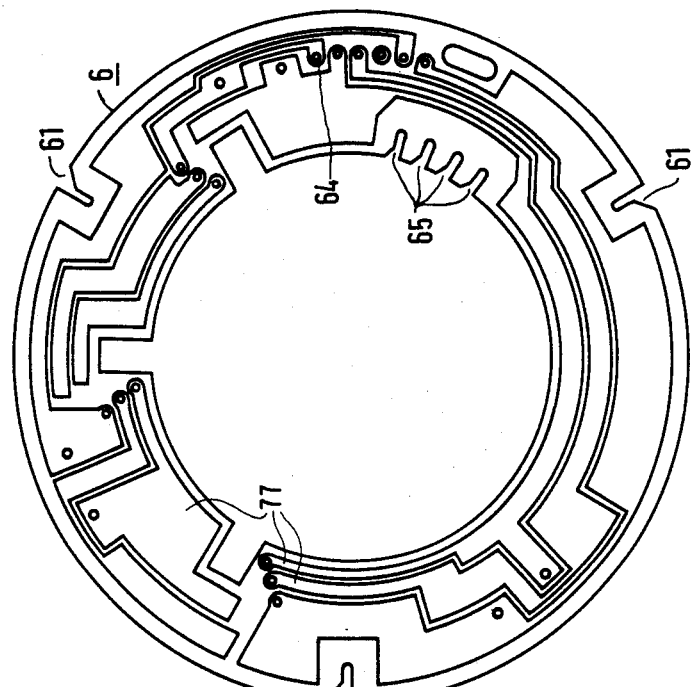
FIG. 7 shows a view of the attachment flange or rear of the circuit board without components.
Figure 6:
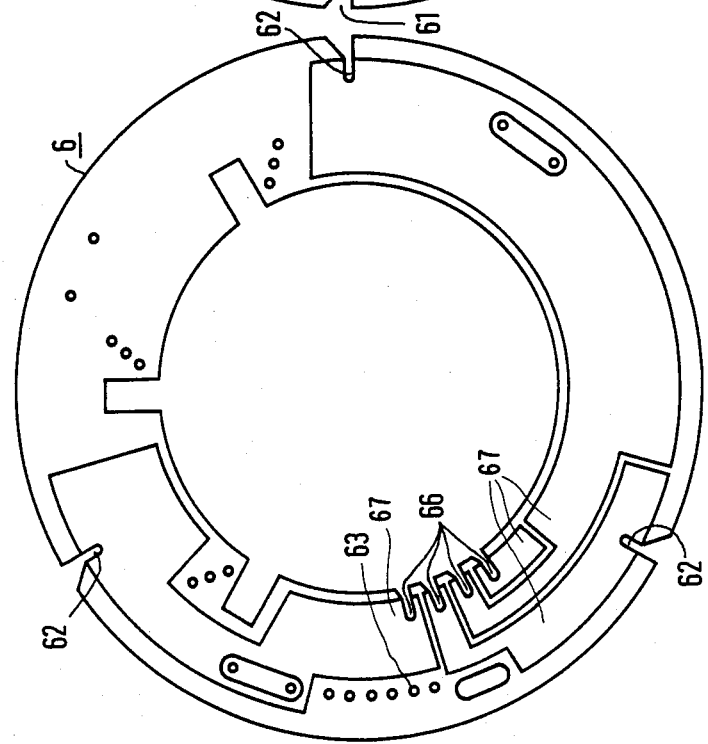
FIG. 6 shows a view of the stator or front side of the circuit board without said components.

FIG. 2 shows a stator-end top view of the circular ring-shaped circuit board 6 mounted on the attachment flange 22, just before its installation on the attachment flange. FIG. 6 shows the front side of the circuit board 6 without its components, but provided with several front conductive strip 67. FIG. 7 shows the back or rear side of the circuit board which, is turned toward the stator-side end face of the attachment flange, still without components but also provided with several rear conductive strips 77. The board 6 is provided with first wire openings 63, second wire openings 65, and third wire openings 61. The second and third wire openings 65, 61 are formed as slit-like threading openings open toward the inner and outer edges of the board 6 respectively. Mounted on board 6 there are several passive and active electrical components described more fully below.

As can be seen especially from FIG. 2, on the inner circular ring edge of the circuit board 6, Hall transducers 15 are arranged in such a way that, as shown in FIG. 1, they are turned toward, and as close as possible to, the opposite end face of the permanent magnet rings 81 of the rotor of the external rotor motor, such that speed-dependent or position dependent signal voltages are generated in the Hall transducers. The lateral connecting ends of the Hall transducers 15 are passed through third wire openings 61 in the circuit board 6 to the back of the circuit board and (as can be seen in particular from the detail representation per FIG. 4) are soldered there to the rear conductive strips 77 at solder points 151–153. In a similar manner (as can be seen from FIG. 3) resistors 16 are mounted on the front of circuit board 6, their connecting ends being passed through openings to the back of the circuit board and contacted there with corresponding conductive strips at solder points 161, 162.

As can be seen from FIG. 2, from an external central contactor 17 a common flat cable leads to the circuit board 6. It is split at the board-side end into first cable portion 12 and second cable portion 13. Portion 12 contains the voltage supply lines for the Hall transducers as well as the signal lines, through which the position- or speed-dependent signals from the Hall transducers 15 are transmitted to an external control unit (not shown). The control unit also sends through the winding feed lines contained in cable portion 13, the current supply for coil winding ends 14 of the stator winding.

As has been described before, the connecting ends of the Hall transducers 15 and the resistors 16 are passed through from the front of the circuit board 6 to the back thereof and are soldered there to the rear conductive strips. To connect these conductive strips with the lines of the cable portion 12, a first the connecting end of the cable is passed through first wire openings 63 to the back of the circuit board and are soldered there at solder points 64 to the rear conductive strips leading to the Hall transducers 15. As can be seen from FIG. 6, the first wire openings 63 are located on the front of circuit board 6 in a section which if free of any rear conductive strips.

For connecting the cable portion 13 containing the winding feed lines to the coil ends 14 of the stator winding, advantageously the second portion 13 has second connecting ends which are passed through from the back of the circuit board 6 through wire openings 65 in the form of slits open at the edge, to the front of the circuit board and are connected at solder points 66 with corresponding conductive strips on the front, which in turn then lead to third wire openings 61 at the periphery of the outer circular ring edge of the circuit board for the connecting ends of the winding feed lines. The installation of the split flat cable is illustrated in FIG. 5.

The circuit board 6, prefabricated as described before and shown in FIG. 2, is brought into its final position on the bearing flange 2 of the external rotor motor per FIG. 1 before it is soldered to the coil ends, as the stator lamination 7 is being placed on the bearing flange 2. The loose coil ends 14 of the stator winding, running along the back of the circular circuit board, are hooked through the slits of the third wire openings 61 open toward the outside of the circular ring. Thereafter the final solder connection of the coil winding ends 14 of the stator winding is made to the solder points 62 at the front of the circuit board 6. Thereby the associated conductive strips conductively connect the coil ends 14 with the winding feed lines of cabe 17.

It is evident that in advantageous manner the connection of the coil ends of the stator winding can occur at the easily accessible front side of the circuit board already brought into its final motor-side mount, there being no need for expensive through-contacts.

What is claimed is:

1. An electric motor, such as a permanent magnet-excited external rotor motor comprising:
    a. a housing with an end face;
    b. stator winding mounted on said housing;
    c. A circuit board mounted on said housing and having a front and a rear side, and first, second and third wire openings, said front side facing said stator winding, said circuit board being accessible only from said front side;
    d. A plurality of front and rear conducting strips disposed on said front and rear sides respectively;
    e. a plurality of passive and active electric components mounted on said circuit board, said components having component connecting means which pass through said circuit baord and are electrically connected to corresponding rear conducting strips;
    f. first external cable means carrying voltage supply and signal lines for said components, said first external cable means passing from said front face to said rear face through said first wire openings and having first connecting end connected to said rear conducting strips;
    g. second external cable means for carrying external winding lines, which supply current for said stator winding, said second external cable means passing from the rear side to the front side through said second wire openings and having second connecting ends electrically connected to associated front conducting strips; and h. internal winding wires passing from said rear side to said front side through said third wire openings and being connecting to said front conductor strips at one winding end, and to said stator winding at another winding end.

2. The electric motor of claim 1 wherein said first and second external cable means are joined in a common cable.

3. The electric motor of claim 2 wherein said common cable is terminated in a common plug.

4. The electric motor of claim 1 further comprising of permanent magnet disposed adjacent to said stator winding for generating an excitation field, where in said circuit board has a circular ring shape with an inner circular edge and an outer circular edge; wherein said components include Hall tranducers for generating output signals to indicate a speed, said Hall transducers being disposed at said inner circular edge; and wherein said third wire openings are disposed at said outer circular edge.

5. The electric motor according to claim 4, wherein second wire openings are arranged at the inner circular edge.

6. The electric motor according to 5, wherein the second and third wire openings are formed as slit-like threading openings open toward the inner and the outer circular edges, respectively.

7. The electric motor according to claim 6, wherein the circuit board is mounted between an axially projecting peripheral edge integrally formed on an attachment flange of said housing at small axial distance from the stator-side end face thereof, and said second external cable means, and the internal winding wires are installed in the space between the stator-side end face of the attachment flange and the rear face of the circuit board.

* * * * *